United States Patent

De Koe et al.

[15] 3,699,260

[45] Oct. 17, 1972

[54] TELECOMMUNICATION SYSTEM WITH TIME DIVISION MULTIPLEX

[72] Inventors: Oscar Bernardus Philomenus Rikkert De Koe, Emmasingel, Eindhoven; Robert Jacques Marie Verbeek, Hilversum, both of Netherlands

[73] Assignee: U.S. Philips Corporation, New York, N.Y.

[22] Filed: June 14, 1971

[21] Appl. No.: 152,524

[30] Foreign Application Priority Data

June 24, 1970 Netherlands..............7009247

[52] U.S. Cl. ..............................................179/15 BS

[51] Int. Cl...............................................H04j 3/06

[58] Field of Search.........................179/15 A, 15 AL. 15 BS, 15 BA, 179/15 AQ, 15 BW; 178/50

[56] References Cited

UNITED STATES PATENTS

| | | | |
|---|---|---|---|
| 2,997,545 | 8/1961 | Hartley | 179/15 AL |
| 3,492,430 | 1/1970 | Viglianti | 179/15 AL |
| 3,522,381 | 7/1970 | Feder | 179/15 A |
| 3,541,524 | 11/1970 | Blasbalg | 178/50 |

*Primary Examiner*—Ralph D. Blakeslee
*Attorney*—Frank R. Trifari

[57] ABSTRACT

A telecommunication system with time division multiplex in which receive time multiplex transmission systems are connected to respective data stores of a group of cyclic data stores, each of which has a cycle time of one channel interval ad a plurality of store locations the number of which is at least equal to the number of channels of a time multiplex transmission system. The cyclic data stores are connected to an adjustable second-order multiplexer. The line units of the send time multiplex transmission systems are connected to an adjustable second-order demultiplexer. A connecting arrangement is connected between the adjustable second-order multiplexer and the adjustable second-order demultiplexer. Associated with the receive time multiplex transmission systems are address stores for the arbitrary association of the store locations of the cyclic data stores with the channels of the receive time multiplex transmission systems.

2 Claims, 1 Drawing Figure

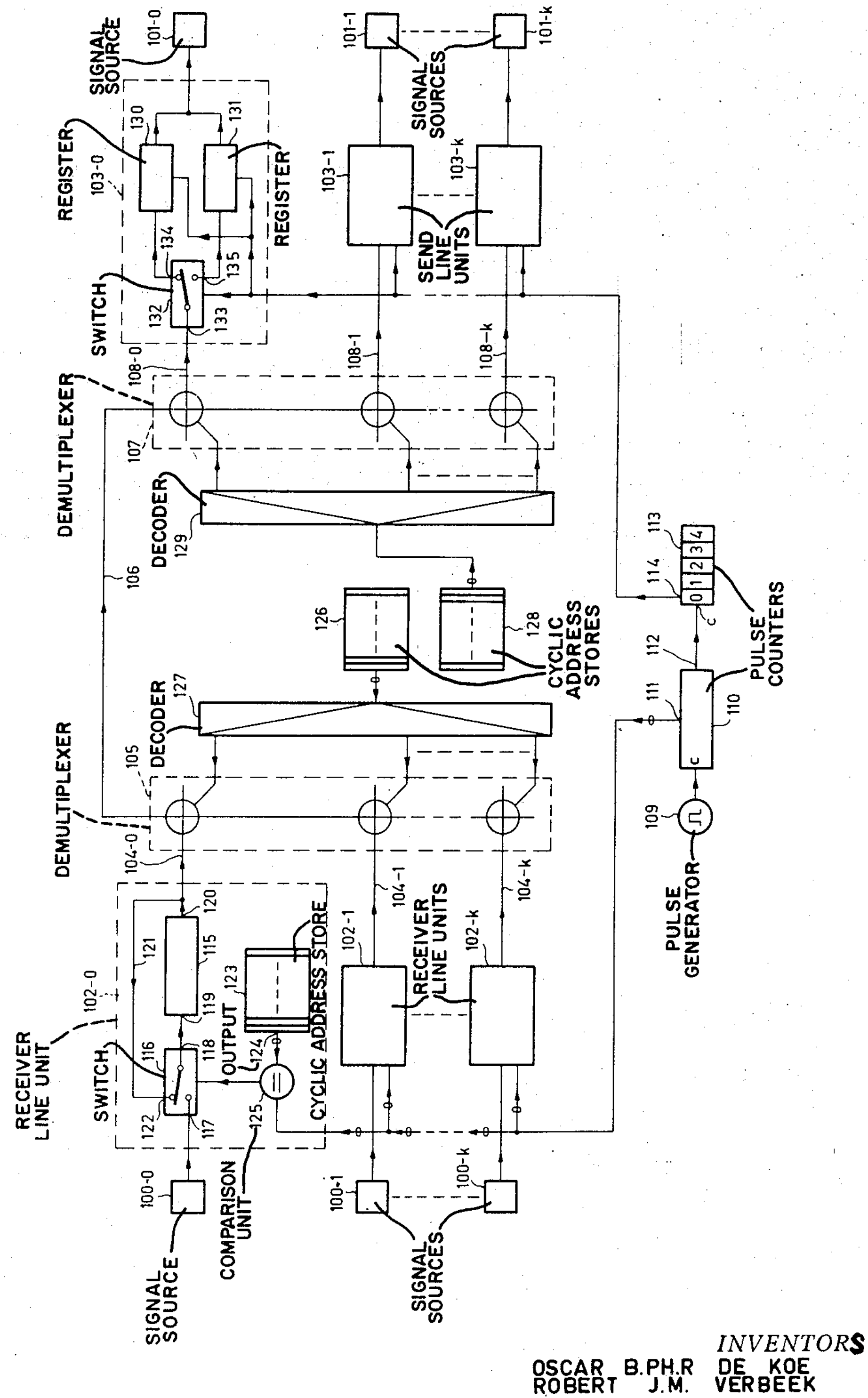
INVENTORS
OSCAR B.PH.R DE KOE
ROBERT J.M. VERBEEK
BY
AGENT

TELECOMMUNICATION SYSTEM WITH TIME DIVISION MULTIPLEX

The invention relates to a telecommunication system with time division multiplex, comprising a group of sources of time multiplex telecommunication signals, each source comprising a group of single receive transmission channels for transferring information characters, a group of sinks for time multiplex telecommunication signals, each sink comprising a group of single send transmission channels for transferring information characters, a clock for generating a time scale which is divided into mutually equal frame time intervals, each of which is divided into mutually equal main time intervals, each of which is divided into mutually equal sub-time intervals, a main time interval having the same relative position in each frame time interval being associated with each single transmission channel in each frame time interval, a receive line unit for each source of time multiplex telecommunication signals, said line unit comprising a cyclic data store having a cycle time of one main time interval and a plurality of store locations for storing characters the number of which is at least equal to the number of single transmission channels of the source of time multiplex telecommunication signals and an access unit for giving the source of time multiplex telecommunication signals access to the cyclic data store, a send line unit for each sink of time multiplex telecommunication signals, said line unit comprising registers for receiving information characters in sub-time intervals and for transmitting information characters in main time intervals.

A telecommunication system of this kind is known from the Netherlands Pat. application No. 6,809,491 laid open for public inspection in the name of the Applicant. In the telecommunication system described therein, the receive line units are connected to the inputs of a space-division switching network and the send line units are connected to the outputs of the switching network. A space-division switching network of this kind comprises a comparatively large number of crosspoints.

The invention has for its object to reduce the required number of crosspoints by providing a novel concept of the telecommunication system of the kind set forth.

The telecommunication system according to the invention is characterized in that the outputs of the cyclic data stores of the receive line units are connected to the inputs of an adjustable second-order multiplexer which is controlled by a first cyclic address store having a cycle time of one frame time interval and a plurality of store locations the number of which is equal to the number of subtime intervals of one frame time interval, the inputs of the send line units being connected to the outputs of an adjustable second-order demultiplexer, which is controlled by a second cyclic address store having a cycle time of one frame time interval and a plurality of store locations the number of which is equal to the number of sub-time intervals of one frame interval, a third cyclic address store connected to the access unit being associated with each receive line unit, said third address store having a cycle time of one frame time interval and a plurality of store locations the number of which is equal to the number of main time intervals of one frame time interval, for the arbitrary association of the store locations of the cyclic data store with the angle transmission channels of the source of time multiplex telecommunication signals, a connecting arrangement being connected between the output of the second-order multiplexer and the input of the second-order demultiplexer.

In order that the invention may be readily carried into effect, one embodiment thereof will now be described in detail, by way of example, with reference to the accompanying diagrammatic drawing.

The telecommunication exchange, which is shown in the form of a block diagram in the FIGURE, comprises a group of sources of digital time multiplex telecommunication signals 100-0, 100-1,---, **100-*k* and a group of sinks of digital time multiplex telecommunication signals 101-0, 101-1, ---, 101-k**.

Each source supplies a multiplex signal in a given time scale which is the same for all sources and which is determined by the (local) clock of the telecommunication exchange. The time scale consists of mutually equal frame time intervals, each of which is divided into mutually equal main time intervals $t_0$, $t_1$, ---, $t_{31}$. one main time interval having the same relative position, i.e., the same number, in each frame time interval constitutes a time channel. Each time channel is associated with a source of single telecommunication signals. In this way each source of time multiplex telecommunication signals comprises 32 sources of single telecommunication signals. Each source of single telecommunication signals supplies in the main time interval associated therewith an information character in a binary code comprising several bits. The bits of a character may be transmitted in a series form or in a parallel form. In the former case each main time interval is divided into mutually equal bit intervals, the number of which is equal to the number of bits of a character. In the second case the bits are transmitted simultaneously via a group of lines, the number of which is equal to the number of bits of a character. Conversions from the series to the parallel form and vice versa can be effected arbitrarily, and do not affect the operating principle of the telecommunication exchange. Hereinafter only the transmission of integral characters will be described. It may assumed that the characters are transmitted in a parallel form and are processed by the switching networks of the telecommunication exchange in a parallel form.

The association of the sources of single telecommunication signals with the time channels may have been effected in the telecommunication exchanges or concentrators which are remote from the telecommunication exchange under consideration and which are connected to the latter via time multiplex transmission systems. These time multiplex transmission systems are terminated in the telecommunication exchange under consideration by regeneration and synchronization units, which convert the time multiplex telecommunication signals originating from the time multiplex transmission systems from the time scale of the relevant time multiplex transmission system to the time scale of the telecommunication exchange under consideration. Each time channel of a time multiplex transmission system, hereinafter called (single) transmission channel, has associated therewith a channel number by the remote telecommunication exchange. In the telecommunication exchange under consideration this channel number is regenerated from the received time multiplex telecommunication signal which contains synchronization information in given bit locations. The channel number will generally deviate from the number of the main time interval in the telecommunication exchange under consideration. At any instant each single receive transmission channel has a given given main time interval number, be it that this number may differ from instant to instant on account of the synchronization.

The sources of time multiplex telecommunication signals 100-0, 100-1,---, **100-*k* are connected to the receive line units 102-0, 102-1, ---, 102-*k*. The sinks of time multiplex telecommunication signals 101-0, 101-1, ---, 101-*k* are connected to the send line units 103-0, 103-1, ---, 103-*k***. These sinks are formed, for example, by time multiplex transmission systems connecting the telecommunication exchange under consideration to remote telecommunication exchanges or concentrators. The channel numbers of the single transmission channels of these send time multiplex transmission systems are given by the number of the main time intervals of the telecommunication exchange under consideration.

The receive line units 102-0, 101-1, ---, **102-*k* are connected via the intermediate highways 104-0, 104-1, ---, 104-*k* to the inputs of an adjustable second-order multiplexer 105. The output of this multiplexer is connected via a central intermediate highway 106 (generally a switching network) to the input of a second-order demultiplexer 107. The outputs of the latter are connected via the intermediate highways 108-0, 108-1, ---, 108-*k* to the send line units 103-0, 103-1, ---, 103-*k***.

The receive line units 102-1, ---, **102-*k* are constructed in the same way as line unit 102-0. In the FIGURE the line units 102-1 and 102-*k* are represented by blocks. The line units 102-2 to 102-(*k*-1) are represented by the broken line shown between these blocks. The foregoing applies in an analogous manner to the send line units 103-1, ---, 103-*k***.

Each of the main time intervals of the telecommunication exchange is divided into $m$ mutually equal sub-time intervals $s_0$, $s_1$, ---, $s_{m-1}$, so that one cycle of the telecommunication exchange, i.e., one frame time interval, comprises 32. $m$ sub-time intervals. Hereinafter it will be demonstrated that the telecommunication exchange is free from internal blocking if $m = 32+k$.

The telecommunication exchange comprises a clock pulse generator 109 which supplies an equidistant sequence of clock pulses $cs$, the clock pulse periods of which determine the sub-time intervals. These clock pulses are supplied to the clock pulse input of a modulo-$m$ pulse counter 110. This pulse counter has a cycle of $m$ clock pulses. In each sub-time interval the number thereof is presented in a binary code and in a parallel form on the output 111. This output is connected to all receive line units 102-0, 102-1, ---, **102-*k*. An output 112 of pulse counter 110, on which a pulse appears once every cycle, is connected to the clock input of a modulo-32 pulse counter 113. The pulse periods of the pulses appearing on output 112 determine the main time intervals. The pulse counter 113 comprises five binary stages which are numbered o to 4 in the FIGURE. The output 114 of the first stage (o) of pulse counter 113 is connected to all send line units 103-0, 103-1, ---, 103-*k*. This first stage counts the main time intervals modulo-2 so that the output alternatively has the logical voltage levels 0 and 1 in successive main time intervals. The cycles of pulse counter 113** determine the frame time intervals.

The receive line unit 102-0 comprises a delay unit 115 which causes a delay of one main time interval and in which $m$ characters can be present at any given instant. The delay unit 115 is formed, for example, by a shift register comprising $m$ stages, in each of which a character can be stored, which is controlled by the clock pulses of clock pulse generator 109.

From source 100-0 the characters are supplied to the input 117 of a change-over switch 116, the output 118 of which is connected to the input 119 of delay unit 115. The output 120 of delay unit 115 is connected to the intermediate highway 104-0 and is connected, via a return line 121, to the input 122 of change-over switch 116. Except during one sub-time interval of each main time interval, the change-over switch 116 connects the input 122 to the output 118. A character occurring on the output 120 of delay unit 115 is then supplied via line 121 and change-over switch 116 to the input 119 and will pass through the delay unit again. In the sub-time interval in which change-over switch 116 connects input 117 to the output 118 a character will be supplied from source 100-0 to the input 119 instead of the character which appears on the output 120 in this sub-time interval.

It is to be understood that even through change-over switch 116 is represented in the FIGURE by a mechanical change-over contact, this change-over switch is constructed in practice, of course, from fast acting electronic components.

In the described manner the change-over switch 116 performs two functions. The first function is making the characters circulate through the delay unit and the second function is the sampling, once every main time interval during one sub-time interval, of the character supplied by the source 100-0 in this main time interval. Due to this sampling the duration of each character is reduced from one main time interval to one subtime interval.

Delay unit 115, in conjunction with return line 121 and change-over switch 116, forms a cyclic date store having a cycle duration of one main time interval and $m$ store locations, in each of which a character can be stored. The store locations are numbered in accordance with the sub-time intervals in which the store locations are accessible.

Line unit 102-0 comprises a cyclic address store 123 for determining the sub-time intervals in which characters of source 100-0 are sampled. The cyclic address store 123 has a cycle time of one frame time interval and 32 store locations, in which of which a sub-time interval number can be stored. The contents of each store location are supplied to the output 124 in each frame time interval in a main time interval having the same relative position, i.e., the same number, in each frame time interval.

The store locations of the address store 123 are numbered in accordance with the main time intervals in which the constants are supplied to the output 124. The output 124 is connected to a comparison unit 125, the other side of which is connected to the output 111 of pulse counter 110. In each main time interval address store 123 supplies a sub-time interval number to comparison unit 125 and in each sub-time interval pulse counter 110 supplies the number of the sub-time interval to the comparison unit 125. In the sub-time interval in which comparison unit 125 establishes that these two numbers are the same, it supplies a signal to change-over switch 116 such that the latter connects the input 117 to output 118 during the sub-time interval. The character supplied by source 100-0 in the main time interval is then stored in the store location of the data store, the number of which is the same as the number which is supplied by the address store 123 to comparison unit 125 in the main time interval. The character which was stored in this store location is automatically erased as in the relevant sub-time interval the connection between input 122 and output 118 of change-over switch 116 is interrupted.

In the manner described above all characters originating from a given single transmission channel are stored in the same store location of the cyclic data store. Each single transmission channel corresponds to a given main time interval number, and hence to a store location of the address store 123. By storing an arbitrary sub-time interval number in the latter store location, any arbitrary store location of the cyclic data store can be associated with the single transmission channel.

The second-order multiplexer 105 comprises a cross-point between each input and the output. These cross-points are controlled by a cyclic address store 126 via a decoder 127. The cyclic address store 126 has a cyclic time of one frame time interval and has 32·*m* store locations, in each of which a line number can be stored. A receive line unit and the associated crosspoint of multiplexer 105, is identified by means of this line number. The content of each store location of address store 125 is supplied in each frame time interval in a sub-time interval having the same relative position, i.e., the same main time interval number and the same sub-time interval number in each frame time interval, to the decoder 127. The crosspoint identified by the content of the store location, i.e., the line number, is driven into the conducting state in each frame time interval during the relevant sub-time interval for transmitting a character from the relevant intermediate highway of the group 104 (104-0, 104-1, ---, 104-*k*) to the intermediate highway 106.

The store location of the address store 126 are numbered in accordance with the number of the main time interval and the number of the sub-time interval in which the content of the store location is supplied to the decoder 127. The number of the store location, therefore, consists of two parts which is noted as: *x*, *y*, where *x* is the main time interval number and *y* is the sub-time interval number.

The second-order demultuplexer 107 has a cross-point between the input and each output. These cross-points are controlled by a cyclic address store 128 via a decoder 129. The address store 128 is identical to address store 126. The demultiplexer 107 has the inverse operation of multiplexer 105. A line number which is stored in address store 128 identifies a send line unit, and the associated crosspoint of demultiplexer 107.

The send line unit 103-0 comprises two one-character registers 130 and 131 and a change-over switch 132. The intermediate highway 108-0 is connected to the input 133 of the change-over switch 132 and the outputs 134 and 135 are connected to the registers 130 and 131. The output 114 of pulse counter 113 is connected to the change-over switch 132 and to the register 130 and 131. The change-over switch is thus controlled such that input 133 is alternately connected in successive main time intervals to output 134 and output 135. The registers 130 and 131 are controlled by pulse counter 113 such that the register which is not connected to intermediate highway 180-0 supplies the character stored therein to the sink 101-0. In this way a character is alternately received and transmitted by each register in successive main time intervals. A received character has a time duration of one sub-time interval and a transmitted character has a time duration of one main time interval. Each register thus performs the function of a pulse widener. Each register may, in addition, have the function of a parallel-series converter. This function, however, is irrelevant for the principle of the telecommunication exchange under consideration.

A time-derived connection between a single transmission channel of one of the sources 100-0, 100-1, ---, 100-*k* and a single transmission channel of one of the sinks 101-0, 101-1, ---, 101-k is characterized by the numbers *x* and *y*, where *x* represents the main time interval number and *y* represents the sub-time interval number of the connection. Let it be assumed that it is desired to establish a connection between the single transmission channel having the main time interval number *i* of source 100-0 and the single transmission channel having the main time interval number *j* of load 101-0. By examining the store locations of the address stores 126 or 128, a store location having the number *j*-1, *y* is found in which no line number is stored as yet. Subsequently, the following operations are performed:

*1*. In store location *i* of address store 123 the number *y* is stored.

2. In store location *j*-1, *y* of address store 126 the line number of line unit 102-0 is stored.

3. In store location *j*-1, *y* of address store 128 the line number of line unit 103-0 is stored.

The result of these operations is that the characters of the single receive transmission channel are stored in store location *y* of the cyclic data store. In each frame time interval, in the sub-time interval *y* of the main time interval *j*-1, a character is supplied from the receive line unit 102-0, i.e., a character from store location *y* of the cyclic data store, via multiplexer 105 and demultiplexer 107 to the send line unit 103-0. This character is stored in one of the register 130 and 131 and is transmitted in the next main time interval, i.e., the main time interval having the number *j*. In this way all characters originating from the receive transmission channel are supplied to the send transmission channel.

By a suitable choice of the number of sub-time intervals in a main time interval, i.e., of m, it can be achieved that the internal blocking, i.e., the conditional probability that at a calling instant a single receive transmission channel cannot be connected to a single send transmission channel if the latter is free, is be reduced to zero. The internal blocking is zero if $m = n$ + $k$, where $n$ represents the number of single channels of a source. In the example $n=32$. This can be demonstrated as follows. Assuming that at least one send channel having the main time interval number $x+1$ is free, no more than $k$ sub-time intervals of main time interval $x$ will be occupied on intermediate line 106. A single receive transmission channel which is connected to a send single transmission channel occupies one store location of the relevant cyclic data store, so that in the cyclic data store associated with the "calling" receive transmission channel at the most $n$-1 store locations are occupied at the calling instant. The contents of the cyclic data store are supplied to the relevant intermediate highway of group 104 once every main time interval. Then on this intermediate highway at the most $n-1$ sub-time intervals of main time interval $x$ are occupied. On intermediate highway 106 at the most $k$ sub-time intervals of main time interval $x$ are occupied so that by choosing $m = n-1+k+1=n+k$ it is always possible to find a sub-time interval of main time interval $x$ which is free on the relevant intermediate highway of group 104 and on the intermediate highway 106. It is then possible to connect each "calling" receive transmission channel to each free send transmission channel. The equality $m=n+k$, of course, is valid for the ultimate capacity of the telecommunication exchange. Upon installation and during further extensions until the ultimate capacity is reached, it applies that $m>(n+k)$, $k$ having, of course, a lower value than in the case of the ultimate capacity where $m = n+k$.

The maximum character repetition frequency which can be realized on intermediate highway 106 imposes a certain upper limit as regards the connection capacity, i.e., as regards the number of sources of time multiplex telecommunication signals which be be connected to the telecommunication exchange.

If the number of sources exceeds the connection capacity, the sources may be divided into groups, each group having an individual receive group intermediate highway corresponding to the left-hand portion of the intermediate highway 106 shown in the FIGURE. In an analogous manner the sinks are divided into groups, each group having an individual send group intermediate highway corresponding to the right-hand portion of the intermediate highway 106.

Connections between the receive group intermediate highways and the send group intermediate highways can be established via a space-division switching network, the crosspoints of which are controlled by cyclic address stores in sub-time intervals.

It is to be noted that all blocks shown in the figure can be realized by means of circuit elements known in the art. Delays in the transmission of characters can be compensated for in a simple manner in the control of the crosspoints.

What is claimed is:

1. A telecommunication system with time division multiplex, comprising a group of sources of time multiplex telecommunication signals, each source comprising a group of single receive transmission channels for transferring information characters, a group of sinks of time multiplex telecommunication signals, each sink comprising a group of single send transmission channels for transferring information characters, a clock for generating a time scale which is divided into mutually equal frame time intervals, each of which is divided into mutually equal main time intervals, each of which is divided into mutually equal sub-time intervals, a main time interval having the same relative position in each frame time interval being associated with each single transmission channel in each frame time main interval, a receive line unit for each source of time multiplex telecommunication signals, said line unit comprising a cyclic data store having a cycle time of one main time interval and a plurality of store locations for storing characters the number of which is at least equal to the number of single transmission channels of the source of time multiplex telecommunication signals, and an access unit for giving the source of time multiplex telecommunication signals access to the cyclic data store, a send line unit for each sink of time multiplex telecommunication signals, said line unit comprising registers for receiving information characters in sub-time intervals and for transmitting information characters in main time intervals, characterized in that the outputs of the cyclic date stores of the receive line units are connected to the inputs of an adjustable second-order multiplexer which is controlled by a first cyclic address store having a cycle time of one frame time interval and a plurality of store locations the number of which is equal to the number of sub-time intervals of one frame time interval, the inputs of the send line units being connected to the outputs of an adjustable second-order demultiplexer which is controlled by a second cyclic address store having a cycle time of one frame time interval and a plurality of store locations the number of which is equal to the number of subtime intervals of one frame time interval, a third cyclic address store connected to the access unit being associated with each receive line unit, said third cyclic address store having a cycle time of one frame time interval and a plurality of store locations the number of which is equal to the number of main time intervals of one frame time interval, for the arbitrary association of the store locations of the cyclic data store with the single transmission channels of the source of time multiplex telecommunication signals, a connecting arrangement being connected between the output of the second-order multiplexer and the input of the second-order demultiplexer.

2. A telecommunication system as claimed in claim 1, characterized in that $m \geq (n+k)$, where $m$ represents the number of sub-time intervals of one main time interval, $n$ represents the number of single transmission channels of a source of time multiplex telecommunication signals and $k$ represents the number of sources of the group, the cyclic date store of each receive line unit comprising $m$ store locations.

* * * * *